(12) United States Patent
Anderson

(10) Patent No.: US 11,425,090 B2
(45) Date of Patent: Aug. 23, 2022

(54) SYSTEMS AND METHODS FOR ASSOCIATING WEBSITE VISITORS WITH A STICKY DYNAMIC INTERNET PROTOCOL (IP) ADDRESS

(71) Applicant: Cox Automotive, Inc., Atlanta, GA (US)

(72) Inventor: Russell Scott Anderson, Atlanta, GA (US)

(73) Assignee: Cox Automotive, Inc., Atlanta, GA (US)

( * ) Notice: Subject to any disclaimer, the term of this patent is extended or adjusted under 35 U.S.C. 154(b) by 0 days.

(21) Appl. No.: 17/348,512

(22) Filed: Jun. 15, 2021

(65) Prior Publication Data

US 2022/0014496 A1 Jan. 13, 2022

Related U.S. Application Data

(60) Provisional application No. 63/049,502, filed on Jul. 8, 2020.

(51) Int. Cl.
| | |
|---|---|
| *G06F 15/16* | (2006.01) |
| *H04L 61/5046* | (2022.01) |
| *H04L 67/146* | (2022.01) |
| *H04L 61/5014* | (2022.01) |
| *H04L 61/5061* | (2022.01) |

(52) U.S. Cl.
CPC ...... *H04L 61/2046* (2013.01); *H04L 61/2015* (2013.01); *H04L 61/2061* (2013.01); *H04L 67/146* (2013.01)

(58) Field of Classification Search
CPC ............. H04L 61/2046; H04L 61/2015; H04L 61/2061; H04L 67/146

USPC .................................................. 709/203, 245
See application file for complete search history.

(56) References Cited

U.S. PATENT DOCUMENTS

| | | | |
|---|---|---|---|
| 7,761,558 B1 * | 7/2010 | Jindal ................... | H04L 67/303 709/224 |
| 11,063,902 B2 * | 7/2021 | Cheng ................. | H04L 61/2503 |
| 2009/0037602 A1 * | 2/2009 | Patel ................. | H04L 29/12047 709/245 |
| 2017/0214756 A1 * | 7/2017 | Lipka ..................... | H04L 67/02 |

* cited by examiner

*Primary Examiner* — Duyen M Doan
(74) *Attorney, Agent, or Firm* — Eversheds Sutherland (US) LLP

(57) ABSTRACT

The disclosure is directed to, among other things, systems and methods for associating website visitors with a sticky dynamic internet protocol (IP) address. An example method may include identifying one or more first web-based cookies associated with a first IP address or one or more first user agents associated with the first IP address as being received by a web server associated with a website. The example method may also include determining a density measurement for the first IP address, the density measurement being a maximum number of the one or more first web-based cookies or the one or more first user agents that are identified as being received at the web server at a single time. The example method may also include determining that the density measurement is less than or equal to a threshold value. The example method may also include determining, based on the density measurement being less than or equal to the threshold value, that the first IP address is a first sticky dynamic IP address.

20 Claims, 9 Drawing Sheets

SYSTEMS AND METHODS FOR ASSOCIATING WEBSITE VISITORS WITH A STICKY DYNAMIC INTERNET PROTOCOL (IP) ADDRESS

CROSS-REFERENCE TO RELATED APPLICATION(S)

This application claims the benefit of U.S. Provisional Application No. 63/049,502, filed Jul. 8, 2020, the disclosure of which is incorporated herein by reference as if set forth in full.

BACKGROUND

In conventional systems, websites may track user activity using what are known as "cookies." In some instances, cookies may be files transferred between a user's browser and a website server that may allow information about a user's activity to be stored for later usage. This may provide a number of benefits to a user browsing a website, such as saving items in a cart during online shopping sessions. However, there may be a number of problems associated with tracking user activity on a website using cookies. For example, any time a user visits a website using a different device or a different web browser, the website may count the user as a new visitor. Additionally, current web browsers may provide users the capability of performing anonymous browsing, cookie clearing, and third-party cookie blocking. Due to these and other reasons, the number of unique users visiting the website may be skewed if tracked solely based on individual unique cookies received by a web server associated with a website.

BRIEF DESCRIPTION OF THE DRAWINGS

The accompanying drawings form part of the disclosure and are incorporated into the present specification. The drawings, which are not drawn to scale, illustrate some embodiments of the disclosure. The drawings in conjunction with the description and claims serve to explain, at least in part, various principles, aspects, and practical elements of the disclosure. Some embodiments of the disclosure are described more fully below with reference to the accompanying drawings. However, various aspects and elements of the disclosure can be implemented in many different forms and should not be construed as being limited to the implementations set forth herein. Like numbers refer to like, but not necessarily the same or identical, elements throughout.

DETAILED DESCRIPTION

Figure 1:
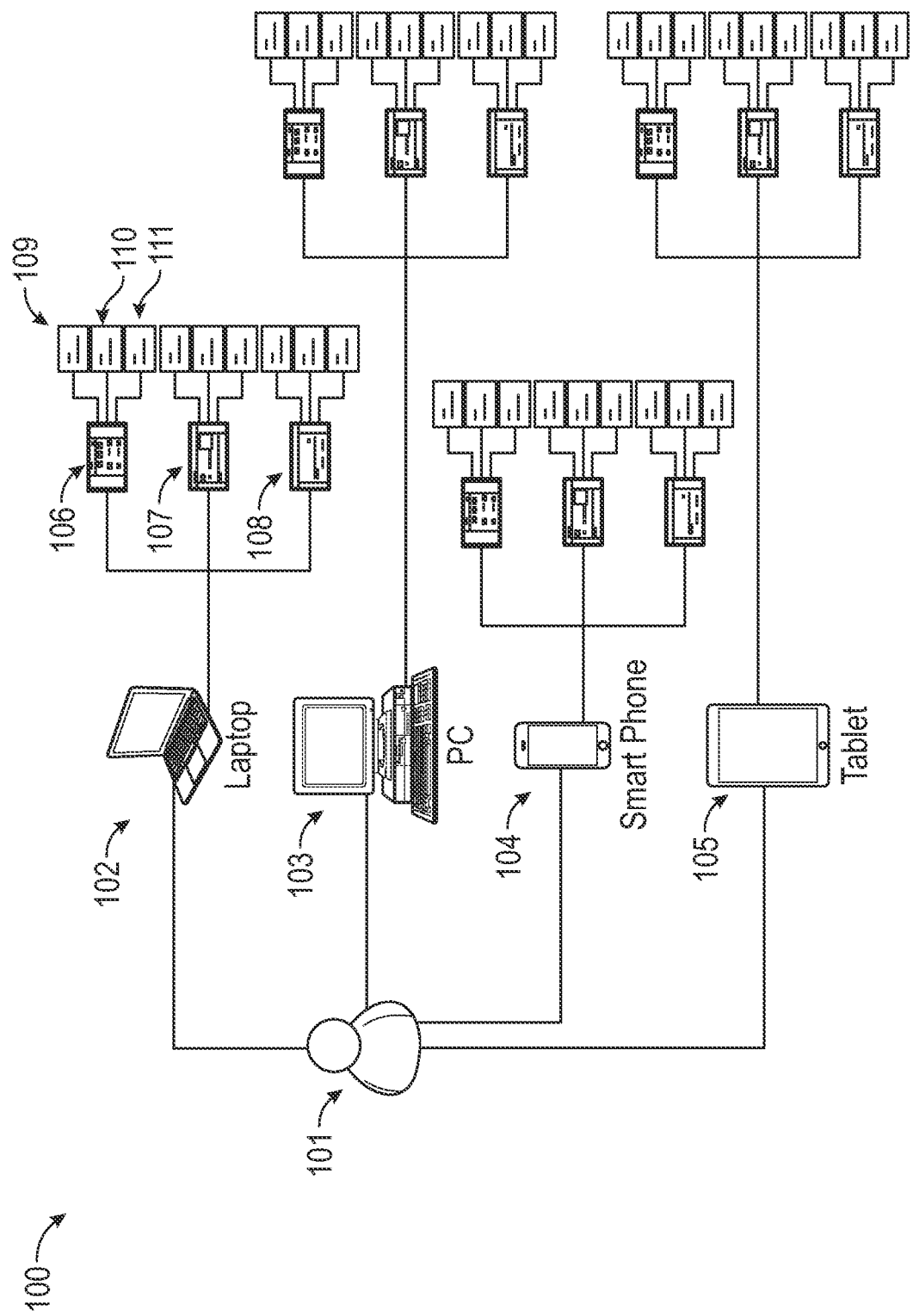
FIG. 1 illustrates an example website activity tracking scenario, in accordance with one or more embodiments of this disclosure.

Disclosed are systems and methods for associating website visitors (for convenience, the term "website" may be used herein, however, the systems and methods described herein may similarly be applied to smartphone application users or the like). With a sticky dynamic internet protocol (IP) address. As opposed to the volatile assigned IP address of Digital Subscriber Line (DSL) and modems, sticky dynamic IP addresses are IP addresses that may not necessarily be changed every time a connection to a network is made. In other words, a sticky dynamic IP address is still a dynamically-assigned IP address, but the IP address that is assigned may typically be the same IP address instead of a unique IP address being assigned at every connection instance. For example, a residential home may have a modem that may be used by a customer to connect to the Internet. Instead of a unique IP being assigned to the modem every time a connection is made (as may be the case with dynamic IP addresses), with a sticky dynamic IP address, the modem may typically be assigned the same IP address. This leads to a more consistent IP address being associated with the modem and the residential home over time. The systems and methods described herein leverage the existence of these sticky dynamic IPs to tie identified website visitors to a sticky dynamic IP address (for example, cookies may be grouped together into a "cluster" tied to the sticky dynamic IP address) in order to more effectively track website activity of the users when a convention method for tracking using every identified instance of a cookie may be less effective. For consistency sake, reference may be made herein to a residential sticky dynamic IP address, however, it should be noted that this is not intended to be limiting and that these systems and methods could also apply to sticky dynamic IP addresses associated with other types of locations as well. These systems and methods may be equally applicable to IPv4 IP addresses or IPv6 IP addresses (for example, a 64 bit subnet of the IPv6 address), as may be described in further detail below.

In conventional systems, websites may track user activity using what are known as "cookies." In some instances, cookies (which may also be referred to herein interchangeably as "cookie ID" herein) may be files transferred between a user's browser and a website server that may allow information about a user's activity to be stored for later usage. Websites may also track user activity using "user agents." A user agent may be a part of an HTTP header provided to the web server that includes certain information, such as, for example, an operating system of the device accessing the website, a browser type, browser version, and/or any other type of information. It should be noted that reference may be made herein to only a cookie ID or only a user agent in some cases, but cookie IDs or user agents may similarly be applicable interchangeably, or a combination of cookie IDs and user agents may also be used as well. Using cookies and/or user agents may provide a number of benefits to a user browsing a website, such as saving items in a cart during online shopping sessions. However, there may be a number of problems associated with tracking user activity on a website using cookies. For example, any time a user visits a website using a different device or a different web browser, the website may count the user as a new visitor. Additionally, current web browsers may provide users the capability of performing anonymous browsing, cookie clearing, and third-party cookie blocking. Due to these and other reasons, the number of unique users visiting the website may be skewed if tracked solely based on individual unique cookies. As mentioned above, the systems and methods described herein mitigate these problems with tracking website activity by clustering cookies and user agents together that are associated with a particular sticky dynamic IP address as a more effective count of the number of website visitors.

In some embodiments, the process of clustering cookie IDs and/or user agents with different sticky dynamic IP addresses may generally involve three steps. The first step may include identifying the subnet of IP addresses associated with website traffic that are sticky dynamic IP addresses. The second step may include tying cookie IDs to these sticky dynamic IP addresses through observed historical intersection (for example, a particular cookie ID has "touched" the sticky dynamic IP at some point in time). The third step may include picking the most likely sticky dynamic IP address that is a primary sticky dynamic IP address for the cookie ID. Although only three steps are described herein, these steps are not intended to be limiting, any other number of steps and/or sub-steps may be applicable as well.

Figure 5A:
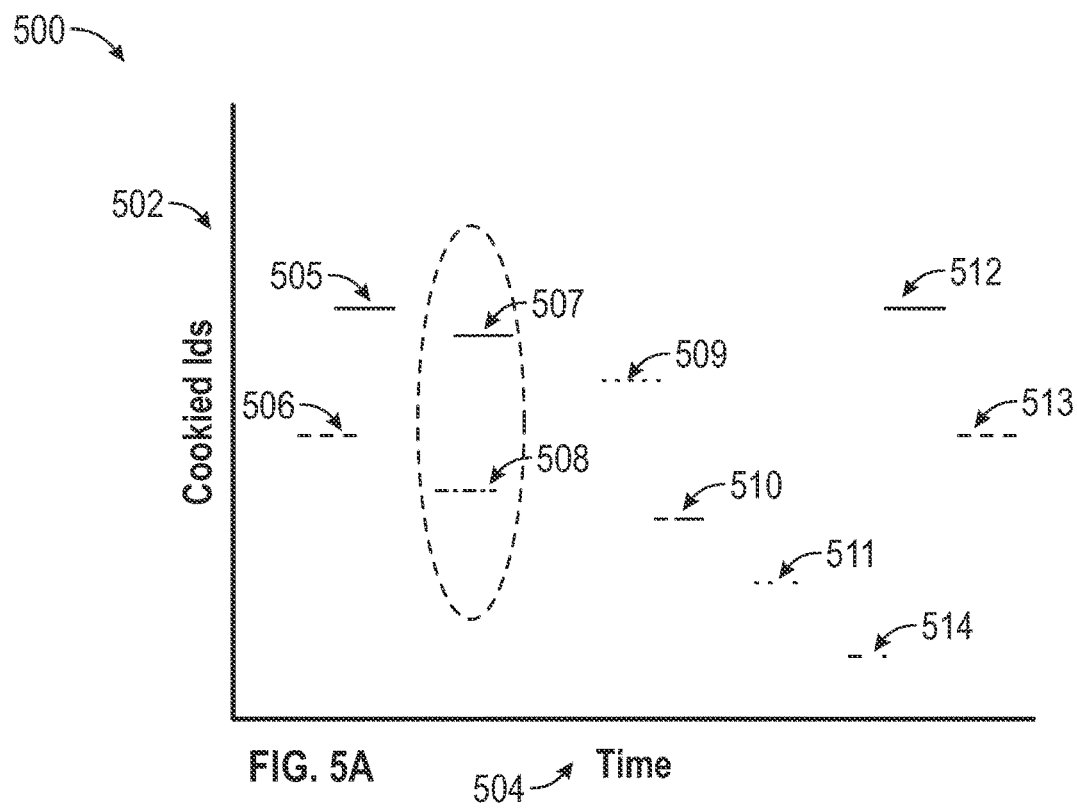
FIGS. 5A-5B illustrate example density measurements, in accordance with one or more embodiments of this disclosure.
Figure 5B:
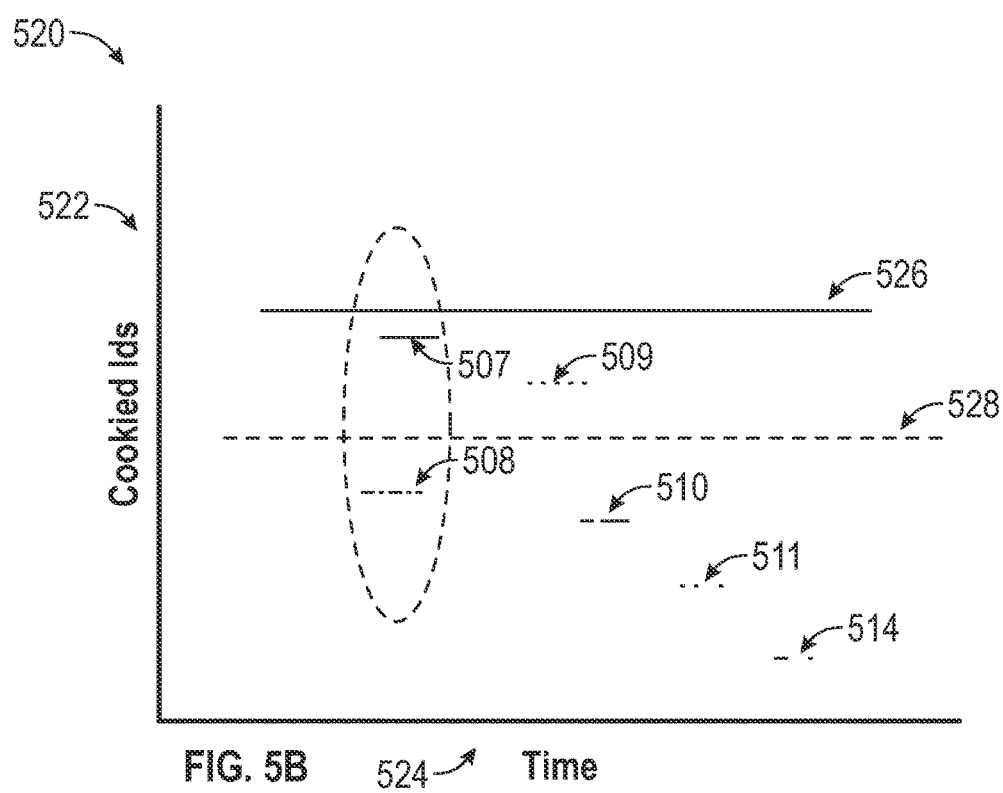

Regarding the first step, the manner in which the sticky dynamic IP address are determined may involve calculating a density measure of unique cookie IDs and/or user agents that are associated with a given IP address of a user that has accessed the website. The density measure may involve taking the lesser of a number of unique cookie ID hits and/or number of unique user agents hits (for example, when a web server receives a cookie ID or user agent associated with a given IP address) that may be identified in association with the website at a single time within a given timeframe (for example, a month window, or any other amount of time). Additionally, for purposes of the density measurement, if a particular cookie ID is identified at one point at a first time, and then the same cookie ID is later identified as being associated with the same IP address at a second time, it may be assumed that the particular cookie ID was associated with the IP address for all of the time in between the first time and the second time as well (this is illustrated in FIGS. 5A-5B, which may describe the density measurement process in additional detail). Once this density measurement is obtained, it may be compared to a threshold value to determine if the IP address is likely a residential sticky dynamic IP address. Specifically, the comparison may involve determining if the density measurement is less than the threshold value, which may be a relatively small numerical value, such as four (but may also be any other value as well). This comparison may be made because it is more likely that a residential sticky dynamic IP address will be associated with a smaller number of users and/or devices (for example, a household may have a modem with a sticky dynamic IP address that provides Internet service for a limited number of users using a limited number of devices).

In some embodiments, the threshold may not necessarily be fixed in all instances, and may need to be adjusted based on the website involved. The threshold may be adjusted because certain websites may drive what or how many devices are used in a typical household. For example, a vehicle trading website may be a content rich website including a large number of photos for browsing. Such a website may also be associated with a focused activity, and not an activity that is performed daily or on the go using a mobile device. This type of website may primarily be used with computers and phones, perhaps tablets. Thus, with this particular website, a smaller threshold may be used. Not everyone in the household may be vehicle shopping at the same time, typically only one person shopping may be shopping at any given time. As a second example, a social media platform may be accessed on a more regular basis and from a wider variety of types of devices. Additionally, multiple household members may be accessing the platform at the same time. In this case, a larger threshold value may be used. As a third example, shopping websites with poor mobile experiences, like may be associated with a lower threshold because it is less likely that a variety of different types of devices may be used to access the website. This value may be determined by maximizing coverage without sacrificing match quality score.

Figure 6:
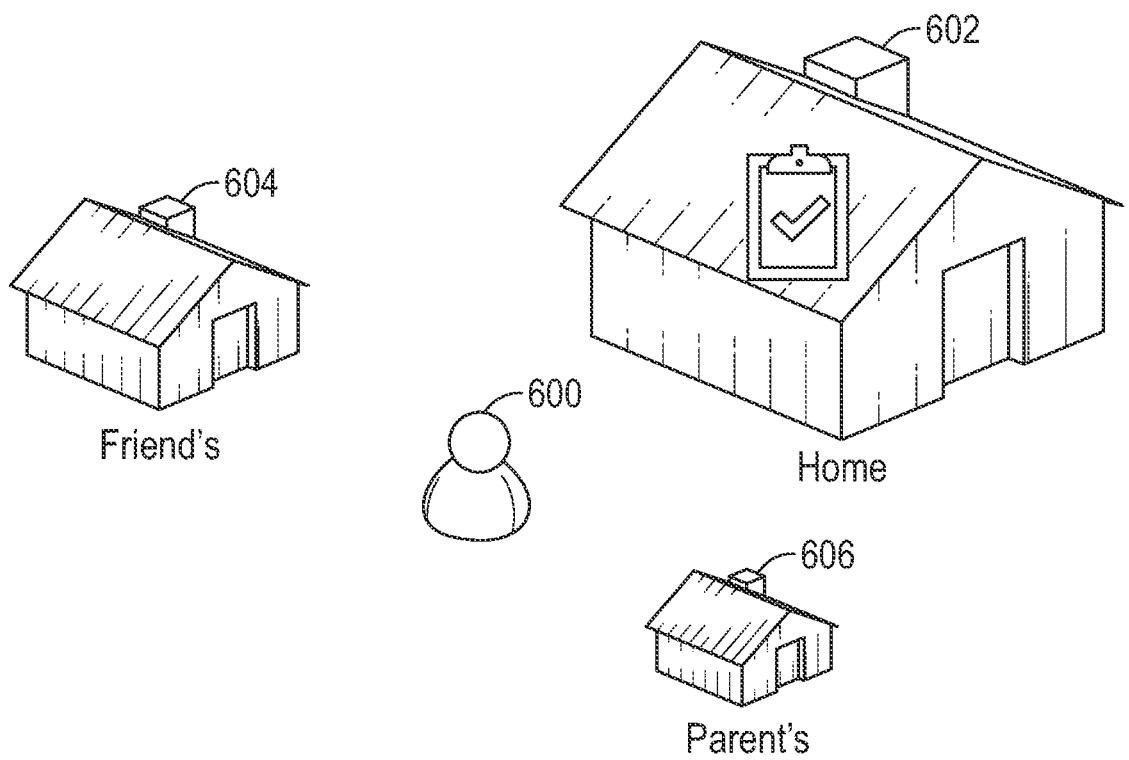
FIG. 6 illustrates a ranking of a primary sticky dynamic IP address, in accordance with one or more embodiments of this disclosure.

Regarding the second step, as sticky dynamic IP addresses are identified, and cookie IDs are associated with the sticky dynamic IP addresses, a relationship table may be generated that may be used to store this information. This relationship table may serve as a frame of reference for user activity on a website that has already taken place. The relationship table may include records of cookie IDs and/or user agents that were received by the web server associated with the website, the IP address that was used to access the website, as well as any other relevant information. For example, the information may include information regarding the website being accessed, a time at which the website was accessed, an amount of time spent on the website, a physical mailing address associated with the IP address, a name of a user associated with the IP address, or any other relevant information. In some cases, different relationship tables may be used for individual websites and/or portions of a website. In other cases, a single relationship table may be used to store information relating to multiple websites and/or portions of website(s). The information may also be stored across one or more relationship tables in any other number of configurations as well. The relationship table may also be used for purposes of associating any cookie IDs and/or user agents received by a web server associated with a website in real-time as well. For example, once the relationship table is established with an initial set of information, any subsequent instances in which a cookie ID or user agent is received at the web server may involve a look-up being performed within the relationship table to determine if the cookie ID and/or user agent is associated with an IP address already stored in the relationship table. If so, the instance of the user accessing the website may be recorded in association with the particular IP address. If not, the IP address may be added to the relationship table as a new IP address. This may be illustrated further in FIG. 6, for example. The relationship table may also include any other information as well. For example, the relationship of a cookie ID to an IP address (or ipv6 64 bit subnet), a first seen date and/or time, a last seen date and/or time, the amount of activity for that cookie ID at the IP. This may be referred to as "hits," but may also be page views, refreshes, and/or any anything that has a good relative indication of activity. With the existence of mixed traffic with IPv6 and IPv4, the relationship table may also have the IPv4 and the IPV6 64 bit Subnet in discrete columns to support direct IP to relationship table lookup. The relationship table may also have any other type of information as well.

Regarding the third step, an indication of whether the IP address is a primary sticky dynamic IP address for the cookie IDs and/or user agents may be determined as well. This may be further illustrated in FIG. 6. That is, a user may access the website through multiple different sticky dynamic IP addresses. For example, the user may access the website through a sticky dynamic IP address tied to a modem located at their personal residence, and may also access the website through a sticky dynamic IP address tied to a modem at a friend's residence or their parent's residence. For website activity tracking purposes, the sticky dynamic IP address that is most often used to access the website may be indicated to be a primary sticky dynamic IP address. This sticky dynamic IP address may include an indication in the record that is a primary sticky dynamic IP address for the cookie ID and/or user agent. In some cases, the indication may be in the form of a "rank" value, which may be a numerical value. A rank value of "1" may be used to indicate a primary sticky dynamic IP address. However, any other value and/or type of indicator may also be stored in the record as well. For example, a boolean, string, and/or any other type of indicator. In some cases, a particular cookie ID or user agent may be recorded as being accessed through a primary sticky dynamic IP address even if the cookie ID or user agent is actually received by the web server of the website from a different IP address. For example, a look-up may be performed using the cookie ID or user agent to identify the sticky dynamic IP address, and the cookie ID and/or user agent may be recorded as if it had accessed the website through the primary sticky dynamic IP address. This may eliminate the need to include records of the cookie ID or user agent being tied to multiple different sticky dynamic IP addresses and may simplify the tracking process. However, in other cases, as mentioned above, instances of cookie IDs and/or user agents being received by the web server may be stored in association with the actual sticky dynamic IP address used to access the website, and the records may include multiple sticky dynamic IP addresses as being associated with a cookie ID and/or user agent.

In some embodiments, the systems and methods described herein may be applicable to both IPV4 and IPV6 addresses. IPv4 IPs may be 4 octets or 8 bit segments in decimal form, each ranging from 0-254 separated by periods. There may be a total of 32 bits of distinct values or 4,294,967,296 IP addresses (an example may include 38.65.207.223). IPv6 IPs may be 8 segments of 4 digits of hexadecimal. Each hex digit is 4 bits ranging from 0-f, which makes each segment 16 bits. Each segment is separated by a colon. There are a total of 128 bits of distinct values or 340 trillion IP addresses (an example may include 2600:1700:8641:6280:ac6a:ef9:dd93:3291). In some cases, on individual hits, the IPv4 value may be from a completely different source than the IPv6. The systems and methods described herein may be applicable to IPv6 IPs using an IPv6 64 bit subnet in place of the full IP address, which may be used for IPV4 IP addresses. That is a 64 bit subnet of the IPv6 IP address may be used. This may be because ISPs have gone from allocating a single sticky IPv4 IP address to allocating a sticky IPv6 64 bit subnet of addresses to each residence. Though, IPv6 is unrelatable if looking at the full IP, if an IPv6 IP address is reduced to just the first four segments of the IP address, then this subnet behaves just like the sticky IPv4 IPs.

Turning to the figures, FIG. 1 illustrates an example of a number of unique cookie ID hits for a website that may be associated with a single user 101. In other words, FIG. 1 may provide an illustration of the benefits of using the systems and methods described herein for tracking user website activity by creating clusters associated with sticky dynamic IP addresses rather than conventional methods that may rely solely on unique cookie IDs. For example, the user 101 may have one or more devices that they may use to access the website at any given time, such as a laptop 102, a desktop computer 103, a smart phone 104, a tablet 105, and/or any other type of device. Additionally, through each individual device, the user may access the same website through multiple different web browsers, such as a first web browser 106, a second web browser 107, a third web browser 108, and/or any other number of web browsers. Even within the different web browsers, in some cases, unique cookie ID hits to the website may be counted for different tabs of the browser, such as a first tab 109, a second tab 110, a third tab 111, and/or any other number of tabs. Furthermore, although not depicted in the figure, current web browsers may provide users the capability of performing anonymous browsing, cookie clearing, and third-party cookie blocking. All of these factors may provide the impression that a large number of unique users are accessing the website whereas only a single user 101 may actually be accessing the website. This may be problematic in instances where such data may be useful for tracking website usage metrics for various purposes, such as determining how many users are accessing a website or portions of a website, determining how often users are accessing the website, determining demographic information associated with the users accessing the website, or any other types of metrics.

Figure 2:
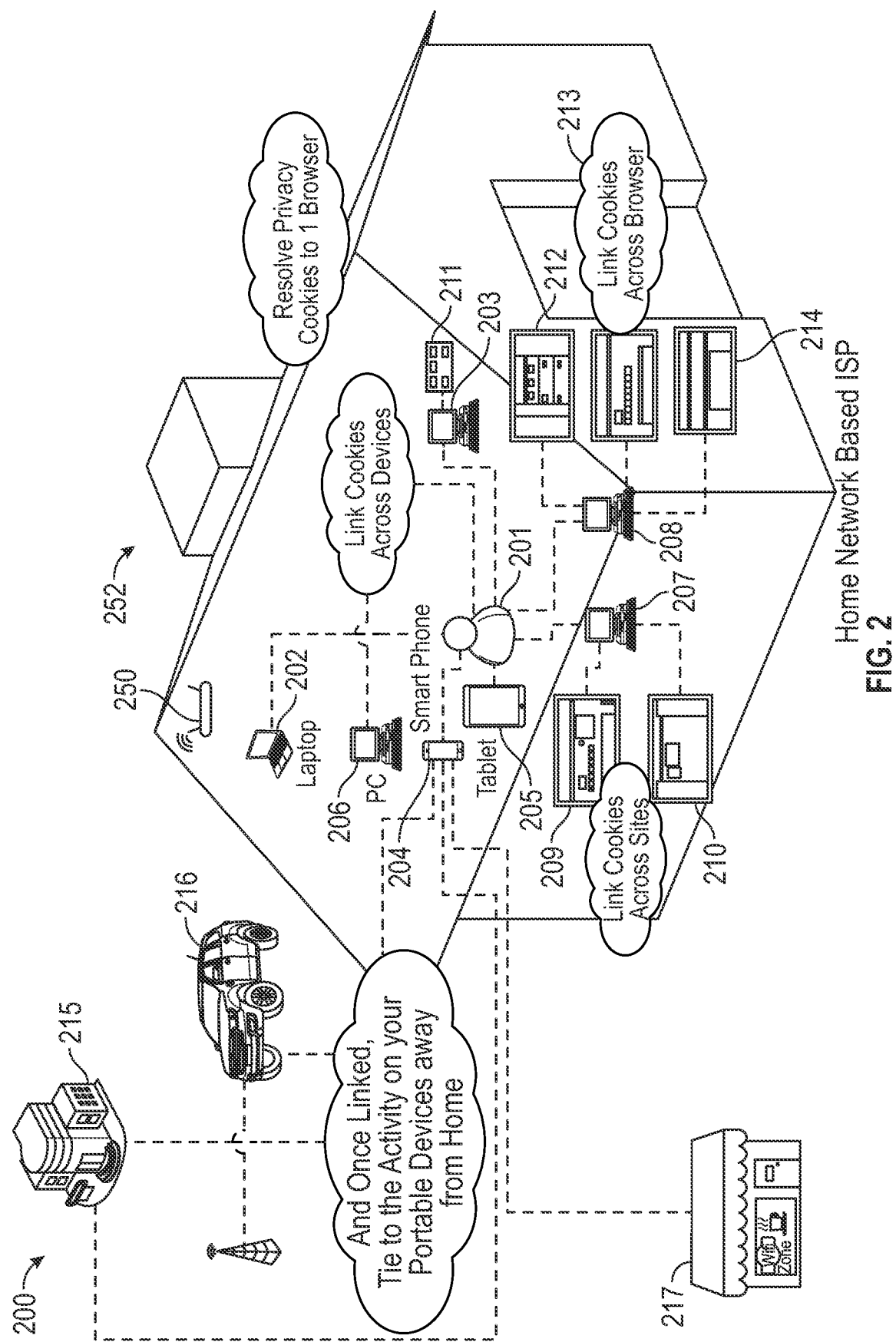
FIG. 2 illustrates an example cluster, in accordance with one or more embodiments of this disclosure.

FIG. 2 illustrates an example cluster 200, in accordance with one or more embodiments of this disclosure. Particularly, the cluster 200 may represent how a sticky dynamic IP address may be used as a reference point to tie different cookie IDs (or user agents) together in a single cluster, even if a website is accessed away from a location associated with the sticky dynamic IP address. For example, the sticky dynamic IP address may be assigned to a modem 250 provided by an ISP that the user 201 may use to access the Internet. As described herein, this may be a more effective method for tracking website traffic, particularly when multiple unique cookie IDs may be identified as accessing the site that are all actually only associated with a single user, for example. In the specific example provided in FIG. 2, the cluster 200 may include one user 201 associated with a sticky dynamic IP address. For example, the sticky dynamic IP address may be associated with a residential household 252 that is inhabited by the single user 201. The user 201 may have one or more devices, such as laptop 202, desktop computers 203, 206, 207, and 208, smart phone 204, tablet 205, as well as any other number and/or types of devices. Additionally, through each individual device, the user 201 may access the same website through multiple different web browsers. For example, the user 201 may access the website through the desktop computer 203 on a first browser 211, through the desktop computer 208 on a first browser 212, second browser 213, or third browser 214, and may access the website through the desktop computer 207 through a first browser 209 or a second browser 210. These are merely examples and not intended to be limiting. The cookie IDs and/or user agents produced by these different devices, browsers, etc. may be grouped together into a "cluster" and may be associated with the sticky dynamic IP address of the modem 250. Given this, even if the user 201 were to leave the location of the sticky dynamic IP address and access the website using a different IP address (for example, at a workplace 215, in a vehicle 216, or at a restaurant 217), the user 201 may still be associated with the sticky dynamic IP address because the user 201 was recorded as "touching" the sticky dynamic IP address in the past (for example, accessing the website through the sticky dynamic IP address). The manner in which this is accomplished may be described in additional detail herein (for example, at least in FIG. 5).

Figure 3:
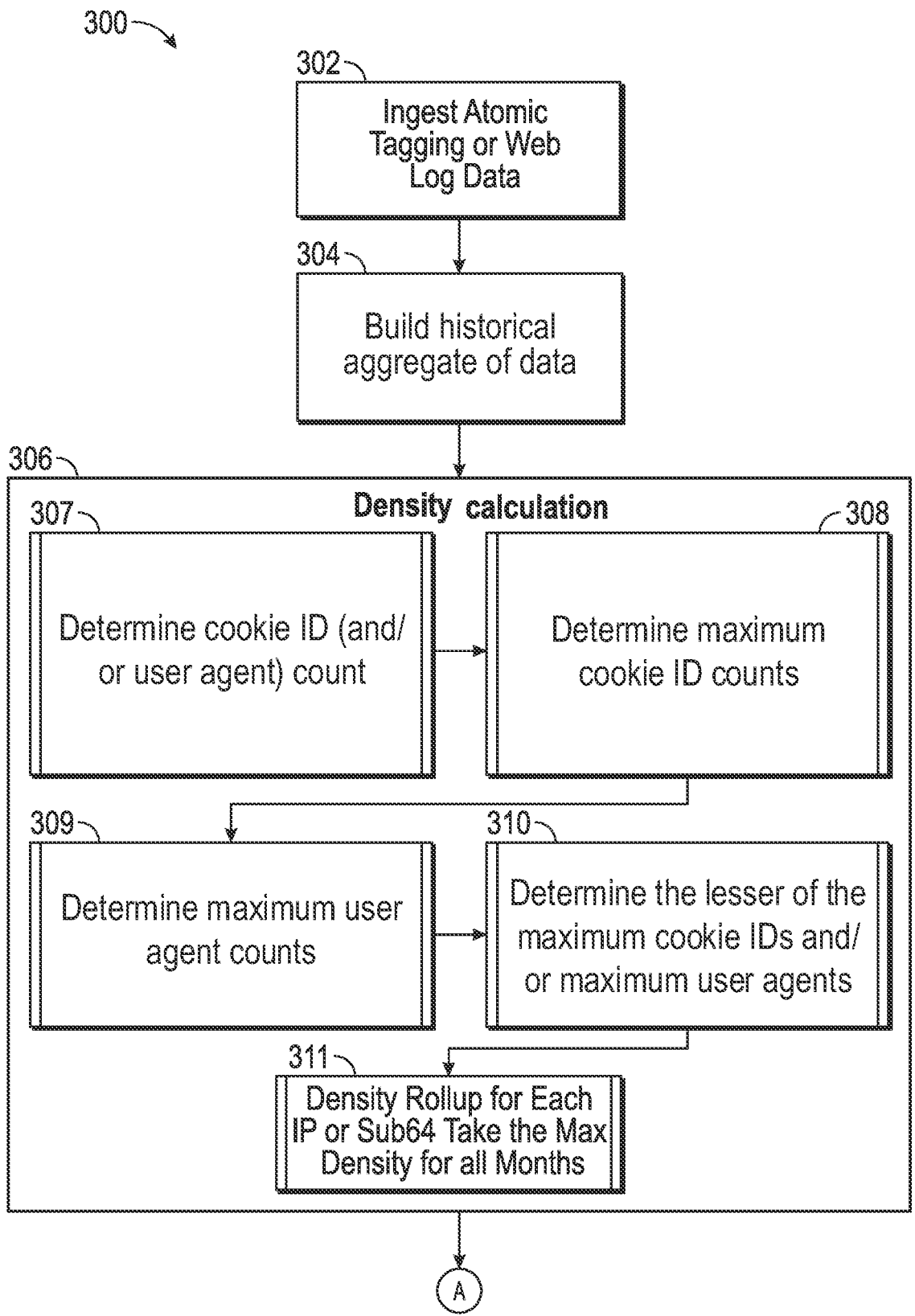
FIG. 3 illustrates an example flow diagram, in accordance with one or more embodiments of this disclosure.
Figure 3:
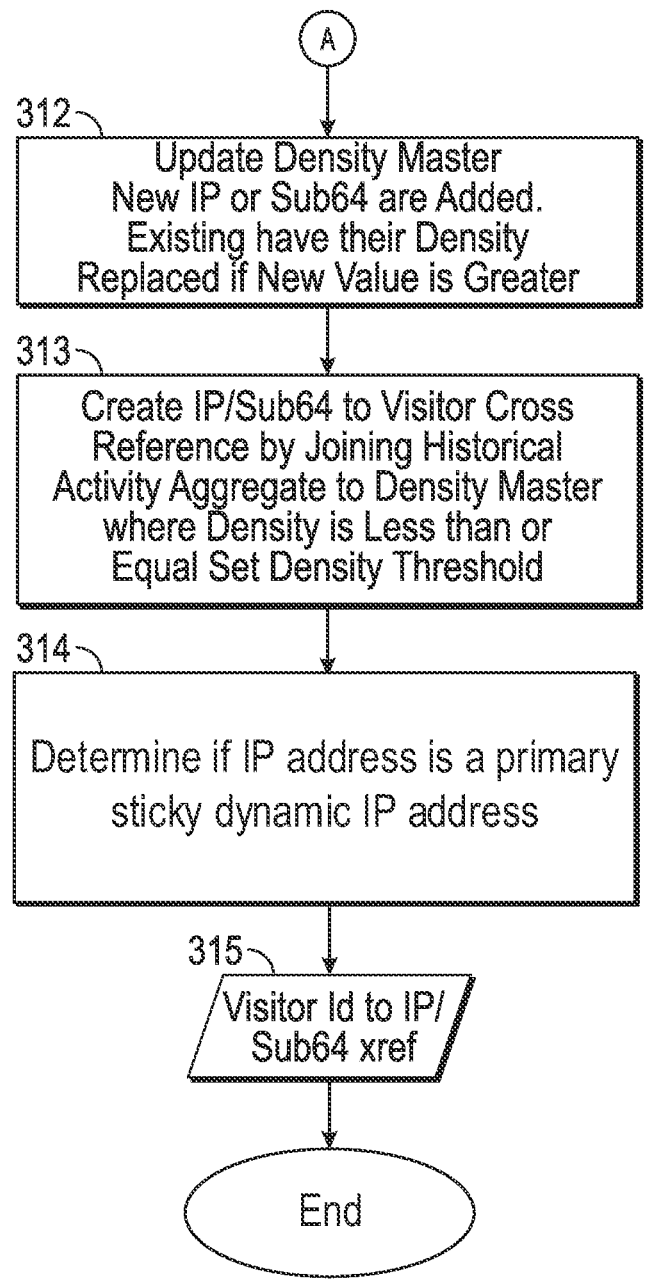

FIG. 3 illustrates an example flow diagram 300, in accordance with one or more embodiments of this disclosure. The flow diagram 300 may illustrate a logical flow that may involve using density measurements to determining if an IP address is a sticky IP address. The flow diagram 300 may begin with operation 302, which may involve receiving data. For example, the data may be atomic tagging or web log data (or any other types of data), which may include data received by a web server associated with a website. This data may include any cookie IDs and/or user agents associated with users accessing the website. Following operation 302, the flow diagram 300 may proceed to operation 304, which may involve building a historical aggregate of the received data, including identified cookie IDs, IP addresses, user agents, and/or any other types of data. In other words, data may be captured over a given timeframe to maximize the probability that all of the unique cookie IDs and/or user agents associated with a potential sticky dynamic IP address would be received by the web server. For example, if data from only a single hour were used to perform the density measurement for an IP address, then it may be likely that only some of the devices associated with the sticky dynamic IP address may have been used to access the website. However, if a longer timeframe, such as a month were used as a timeframe for data collection, then it is more likely that more or all of the users, devices, browsers, etc. would have been used to access the website. This serves to improve the accuracy of the density measurement for the IP address. However, while some example timeframes are mentioned herein, these are not intended to be limiting, and any other timeframes may be applicable.

Following operation 304, the flow diagram may proceed to operation 306, which may include performing the density measurement to determine a maximum density of unique cookie IDs and/or user agents associated with a given IP address within a particular timeframe. The density measurement performed in operation 306 may include one or more sub-operations, including at least sub-operations 307-311. Sub-operation 307 may involve identifying distinct cookie ID (and/or user agent) counts for a given period of time (for example, a month, or any other amount of time). A cookie ID and/or user agent "count" may refer to individual instances at which the web server receives a cookie ID and/or user agent. For example, if a user accesses a website using a laptop, the web server may receive a cookie ID and/or user agent from the laptop at that time, and this may be a single count. From sub-operation 307, the flow diagram 300 may proceed to sub-operation 308. Sub-operation 308 may involve determining a maximum number of concurrent cookie ID counts received by the web server. That is, sub-operation 307 may involve raw data capture in the form of determining what cookie IDs and/or user agents are received and when they are received, and sub-operation 308 may more specifically involve determining an instance within the given timeframe where a maximum number of cookie IDs and/or user agents were received by the web server from the IP address at the same time (or within a relatively small timeframe compared to the overall timeframe used for the density measurement). This may be illustrated in more detail in FIGS. 5A-5B. Determining a maximum number of concurrent cookie IDs and/or user agents within the timeframe may provide an indication of the maximum number of cookie IDs and/or user agents (for example, users, devices, browsers, etc.) that are used at the particular IP address to access the Internet. Sub-operation 309 may be similar to sub-operation 308, but may involve determining a maximum number of distinct user agent counts for the given timeframe rather than the maximum number of cookie IDs.

In some cases, when determining the maximum number of cookie IDs and/or user agents within the given timeframe, multiple instances of the same cookie ID and/or user agent may be treated as if the cookie ID and/or user agent was received at every time between the identified instances. For example, as shown in FIGS. 5A-5B, a particular cookie ID may be received by a web server at a first time in a timeframe and then at a second time in the same timeframe as well. There may also be any other number of instances at which the cookie ID is identified in between the first and last time as well. When this is the case, an assumption may be made that the occurrence of the cookie ID extends from the first time to the second time (as shown in FIG. 3B, for example). That is, a determination may be made that if the cookie ID (and/or user agent) was identified at a starting time and the cookie ID (and/or user agent) was identified at an ending time, where the starting time and ending time are included in the given timeframe, then the cookie ID (and/or user agent) may be treated as if it was received by the web server in all of the time in between the starting time and the ending time. This assumption may be made because some websites may be associated with sparse website activity, so using the continuous cookie IDs (and/or user agents) may help ensure that different cookie IDs (and/or user agents) are identified as being concurrent to help in the density measurement determination.

Following sub-operations 308 and 309, the flow diagram 300 may proceed to sub-operation 310. Sub-operation 310 may involve determining whichever value is smaller of the number of unique cookie IDs and the number of unique user agents. The smaller of the two may be used because there may be scenarios where cookie ID counts or user agent counts may be artificially high. Cookie clearing by privacy applications, privacy modes, or even a cookie bug (for example, a maximum cookie size may be exceeded causing cookies to clear) may result in artificially high cookie ID counts. With respect to user agents, there may be times when browser updates are pushed out more often than normal (for example, when security issues are found by a browser maker). The upgrade may cause a new user agent to be used. Additionally, adding or upgrading a plugin broken by the browser upgrade may cause a new user agent to be created. This may cause an artificially high number of user agents to be identified. Given these potential problems, the lesser of the two values may be used because it may be assumed that these types of scenarios may be unlikely to happen at the same time. Further, by taking the lesser of the two, it may be determined when both the cookie ID counts and user agent counts are also high (for example, if the lesser value is high, then it logically follows that the other value is also high). Once the lesser value is determined, it may then be used as the final maximum density value for the IP address for the given timeframe. Sub-operation 311 may involve determining if the density measurement calculated through sub operations 307-310 is greater than a previous maximum density measurement for that particular IP address. If so, then the most-recently calculated density measurement becomes the new density measurement for that IP address. If not, the previous density measurement may remain as the density measurement. In some cases, this may involve taking a maximum value of the current and previous density numbers (over a given timeframe or including all previously-determined density numbers). This may be done, for example, because a return of a user agent that was last seen six months ago increases things for every month in between, so one of those past months might actually be the new high point, not the most recent month.

In some cases, the density measurement may be performed multiple times (for example, the density recalculation may be performed daily, weekly, monthly, or on any other periodic basis) on a periodic basis in order to update a density measurement associated with a particular IP address. Periodic recalculations may be performed because the number of users, devices, etc., associated with a given IP address may change over time.

Following operation 306, the flow diagram 300 may proceed to operation 312. Operation 312 may involve updating prior density measurement records for the IP address or adding a new IP address if it is not included in any existing records. For example, the IP address associated with the identified cookie IDs and/or user agents may already have a stored record of a previously-determined density measurement of four. If the density measurement for that IP address at a later time is determined to be five, then the record of the density measurement for that IP address may be updated to reflect a density measurement of five rather than four. However, if the IP address is not found in any of the density measurement records, the IP address may be added as a new IP address and may be associated with the current density measurement determined through operation 306, for example. In some cases, this information may be stored in the relationship table. However, this information may be maintained at another location as well.

Following operation 312, the flow diagram 300 may proceed to operation 313. Operation 312 may involve creating a cross-reference between a cookie ID and an IP address when an IP address associated with the cookie ID is less than a density threshold. In other words, this operation involves determining if the IP address from which the website is being accessed is a sticky dynamic IP address based on the density measurement being less than the threshold value. Otherwise, a cross-reference may not be established.

Following operation 313, the flow diagram 300 may proceed to operation 314. Operation 314 may involve identifying a sticky dynamic IP address that is a primary sticky dynamic IP address of the cookie ID. For example, if the sticky dynamic IP addresses are associated with residential homes, a particular user may browse a website at their own home, but may also browse the same website at a friend's home as well. Operation 314 may be used to distinguish between the user accessing the website at their friend's home and their own home so that the user may be associated with the sticky dynamic IP address of their own home. To accomplish this, it may be determined which IP address the cookie ID is associated with more often. Additionally, the count is divided by a calculation using a natural log on an adjustment of the number of days past the last seen time. Then ranking is done on this adjusted hit count from high to low. Typically only Rank=1 is used for each cookie ID. Following operation 314, the flow diagram 300 may proceed to operation 315, which may involve adding the cookie ID to the relationship table as being associated with the IP address (which is determined to be a sticky dynamic IP address). The cookie ID may also be associated with a rank of 1.

Figure 4:
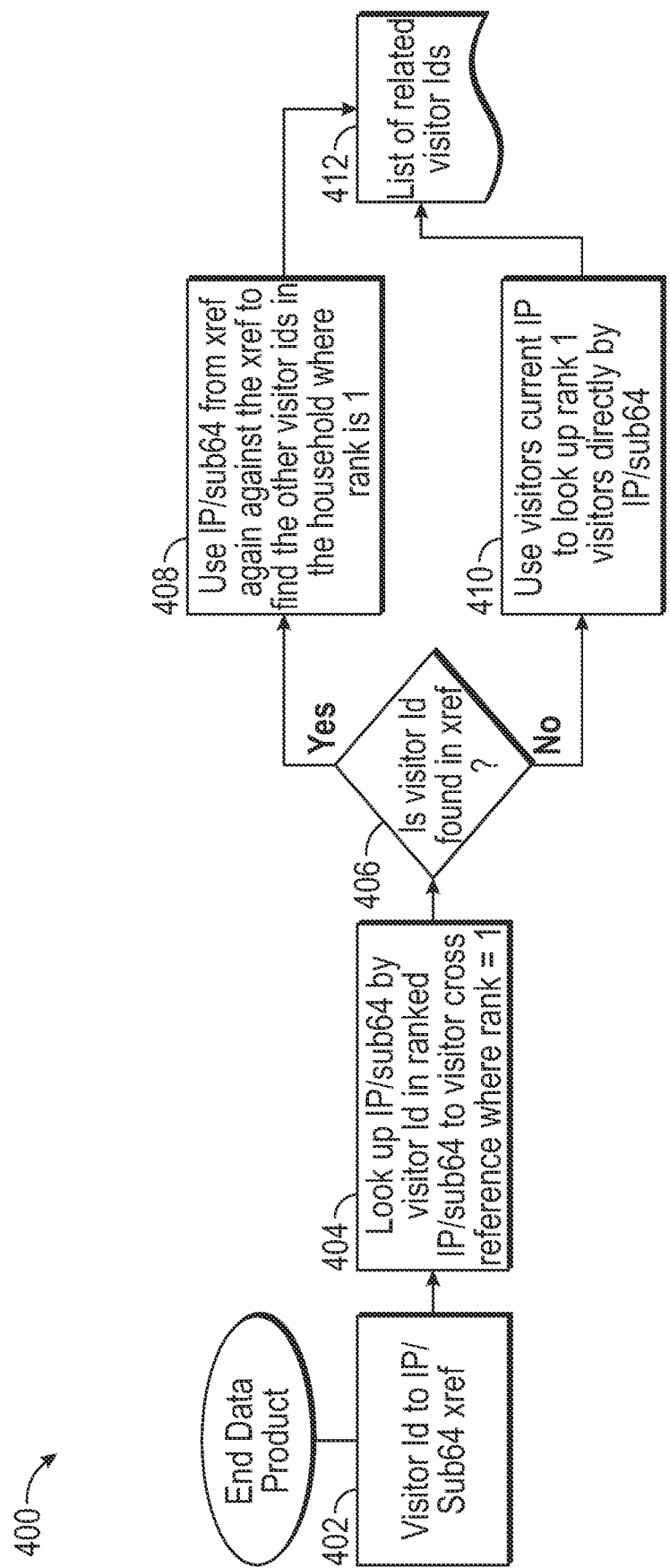
FIG. 4 illustrates an example flow diagram, in accordance with one or more embodiments of this disclosure.

FIG. 4 illustrates an example flow diagram 400, in accordance with one or more embodiments of this disclosure. In some cases, the flow diagram 400 may represent an example of how the systems and methods described herein may be used once an initial set of sticky dynamic IP address associations are created and stored in a relationship table. That is, the flow diagram 400 may relate to operations performed with respect to subsequent cookie IDs that are identified as accessing a website. The flow diagram 400 may begin at operation 402, which may involve identifying a cookie ID at a website. The flow diagram 400 may proceed to operation 404, which may involve looking up the cookie ID in the relationship table. The look-up may involve searching the relationship table for any stored entries, including the cookie ID and an associated rank value of 1. As mentioned above, the rank value may be a numerical value that may be used to indicate that a sticky dynamic IP address is a primary sticky dynamic IP address for a given cookie ID. For example, if the sticky dynamic IP addresses are residential addresses, a user may have a primary household, but may also visit other households. The sticky dynamic IP address of the user's primary household would be associated with a rank value of 1 for that particular cookie ID, whereas sticky dynamic IP addresses associated with other households may have other rank values (or no associated rank value). It should be noted that the indicator as to whether a sticky dynamic IP address is a primary sticky dynamic IP address for a cookie ID may not necessarily be limited to a numerical value, but may also be provided in any other form as well (for example, a boolean, string, etc.). Additionally, if the numerical value is used, it does not necessarily have to be limited to a value of 1.

Following operation 404, the flow diagram 400 may proceed to condition 406, which may involve a determination as to whether the cookie ID is found within the relationship table. If the cookie ID is found in the relationship table, then the flow diagram 400 may proceed to operation 408. If not, the flow diagram 400 may proceed to operation 410. At operation 408, the sticky dynamic IP address that the cookie ID is tied to may be obtained from the relationship table by identifying the sticky dynamic IP address in the relationship table that is associated with both the cookie ID and a rank value of 1. In some cases, the sticky dynamic IP address may be identified using the cookie ID without the rank as well. In this manner, any time a cookie ID is identified as accessing a website, it can be tied to a sticky dynamic IP address, and associated with other cookie IDs that are also associated with that sticky dynamic IP address. At operation 410, if the search in the relationship table does not produce an associated sticky dynamic IP address, then the current IP address associated with the cookie ID may be searched in the relationship table to identify if there are any other rank 1 cookie IDs in the relationship table associated with the same IP address as a backup.

FIGS. 5A-5B illustrate example density measurements, in accordance with one or more embodiments of this disclosure. FIGS. 5A-5B may provide another illustration of how density measurements are performed to supplement the flow diagrams of FIGS. 3 and 4. Density measurements may involve determining a maximum number of concurrent cookie IDs and/or user agents associated with a given IP address that are received at a web server associated with a particular website within a given timeframe (the timeframe may be a month, a year, multiple years, or any other timeframe). For example, one or more users connecting to the Internet using the same IP address may access the website multiple times using different devices, browsers, etc. When the website is accessed by these different users (or a single user) through the different devices, browsers, etc., cookie IDs and/or user agents may be provided to the web server associated with the website. Concurrent cookie IDs and/or user agents may include a group of cookie IDs and/or a group of user agents associated with an IP address that are identified as being received by the web server at the same time or within a short time span. For example, if a first user accesses the website using a smartphone through the IP address at a first time, and a second user also accesses the website using a laptop through the same IP address at the first time, then cookie IDs and/or user agents may be sent to the web server for these two different devices accessing the website at the same time. The same may apply even if only one user is accessing the website using multiple devices or using a single device and multiple browsers. Thus, determining the maximum concurrent cookie IDs or user agents associated with the particular IP address may provide an indication of a maximum number of users, devices, etc., that may be associated with that particular IP address. In some cases, a maximum number may be obtained for cookie IDs, and a separate maximum number may be obtained for user agents, and the lesser of the two may be used as the final density measurement.

In some embodiments, once this density measurement is obtained, it may be compared to a threshold value to determine if the IP address associated with the cookie IDs and/or user agents should be classified as a sticky dynamic IP address. For example, if the density measurement is less than or equal to a value of 4, then the IP address may be considered a sticky dynamic IP address (however, this is not intended to be limiting, and any other threshold may be used as well). The comparison may involve determining if the density measurement is less than or equal to the threshold because it may be assumed that a location associated with a sticky dynamic IP address is more likely to be a location servicing a smaller number of people, such as a residential household.

With respect to the figures themselves, FIG. 5A may depict a first plot 500 including cookie IDs (for simplicity, reference may be made below to cookie IDs, however, these could also be user agents as well) on the y-axis 502 and a timeframe on the x-axis 504. The markings depicted within the plot 500 may represent individual instances of cookie IDs received by a web server associated with a website. For example, the plot 500 may depict cookie ID 505, cookie ID 506, cookie ID 507, cookie ID 508, cookie ID 509, cookie ID 510, cookie ID 511, cookie ID 512, cookie ID 513, cookie ID 514, and/or any other number of cookie IDs. Cookie IDs shown further right on the plot 500 may be cookie IDs that are received by the web server at a later time than cookie IDs further to the left on the plot 500. For example, cookie ID 513 may have been identified as being received by the web server at a later time than cookie ID 512, cookie ID 514, etc. Additionally, cookie IDs located at the same point along the y-axis may represent the same cookie IDs being received by the website. For example, cookie ID 505 and cookie ID 512 may represent the same cookie ID being received by the web server at two different times. The same may apply to cookie ID 506 and cookie ID 513. Furthermore, the cookie IDs depicted in FIG. 5A may be associated with the same IP address. That is, the density measurement illustrated in FIGS. 5A-5B may be used to determine a density of cookie IDs (and/or user agents) for a given IP address in order to determine if the IP address should be classified as a sticky dynamic IP address. In essence, FIG. 5A may depict the actual activity on the website for a given timeframe. Once it is determined that the IP address is a sticky dynamic IP address, a record of the IP address and the cookie IDs and/or user agents associated with that IP address may be stored in a record.

FIG. 5B depicts a second plot 520. Similar to the first plot 500 depicted in FIG. 5A, the second plot 520 depicted in FIG. 5B may include cookie IDs on the y-axis 522 and a timeframe on the x-axis 524. The second plot 520 may also depict the cookie IDs 507, 508, 509, 510, 511, and 514, similar to the first plot 500. However, the second plot 520 may depict that the cookie ID 505 and the cookie ID 512 of the first plot 500 are combined into a first continuous cookie ID 526 that spans the time range from the time at which the cookie ID 505 was identified and the time at which the cookie ID 512 was identified. That is, a determination may be made that if the cookie ID was identified at a starting time (cookie ID 505) and the cookie ID was identified at an ending time (cookie ID 512), where the starting time and ending time are included in the given timeframe, then the cookie ID may be treated as if it was received by the web server in all of the time in between the starting time and the ending time. This assumption may be made because some websites may be associated with sparse website activity, so using the continuous cookie IDs may help ensure that different cookie IDs are identified as being concurrent to help in the density measurement determination. If a cookie ID, for example, is seen before and after another cookie ID, this may be representative a different device/browser that still existed at that residence but did not interact with the website between the two points in time. It is not likely to be the same device that cleared cookies and then later got set back to the very same earlier cookie ID. It is also unlikely that a browser was upgraded and then downgraded back to the exact same user agent. The same may apply to cookie ID 506 and cookie ID 513, which may be combined into continuous cookie ID 528. The remaining cookie IDs may be left as single instances because they may only appear as accessing the website once within the given timeframe.

In some embodiments, once cookie IDs that are identified at a starting time and an ending time within the timeframe are treated as covering the entire time period in between the starting time and the ending time, a maximum amount of cookie IDs identified at a single given time may be determined for the timeframe. In the particular example provided in FIG. 5B, the maximum number of identified cookie IDs may be found at time 526. This maximum number of cookie IDs may include the cookie ID 507, the cookie ID 508, and the continuous cookie IDs 526 and 528. As is shown here, even though the cookie ID 505 and the cookie ID 512 (as well as the cookie ID 506 and the cookie ID 513) do not actually align with the time of the cookie ID 507 and the cookie ID 508, the assumption that these cookie IDs extend through the starting time and the ending time allows the continuous cookie IDs 526 and 528 to be counted as well. Given this, the maximum number of cookie IDs that appear at a single given time in this example is 4, which is used as the density measurement for this IP address for this given timeframe. It should be noted that the timeframe can be any length of time.

Although the example described above may primarily include references to cookie IDs, the same analysis may be applied to user agents identified as accessing the website during the same timeframe. A user agent may be a part of an HTTP header provided to the web server that includes certain information, such as, for example, an operating system of the device accessing the website, a browser type, browser version, and/or any other type of information. The density measurement may be performed on the user agents in addition to the cookie IDs (or alternatively to). If the density measurement is performed for both the cookie IDs and the user agents, then the lesser density measurement of the two may be used as the final density measurements for purposes of determining the IP address associated with the cookie IDs and user agents is a sticky dynamic IP address.

In some embodiments, if the density measurement for the IP address for the given timeframe is less than or equal to a threshold value, then the IP address may be classified as a sticky dynamic IP address. As one non-limiting example, if the threshold is four, then the IP address associated with the example of FIGS. 5A-5B may be considered a sticky dynamic IP address because it has a density measurement of four for this given timeframe. Considering the IP address as a sticky dynamic IP address based on the density measurement being less than the threshold may be used because sticky dynamic IP addresses may be associated with locations including smaller numbers of users, such as a residential household. If a larger number of concurrent cookie IDs are identified in a given timeframe, then it may be more likely that the location includes a larger number of users, and thus may not likely be a location associated with a sticky dynamic IP address. The threshold may be adjusted because certain websites may drive what or how many devices are used in a typical household. For example, a vehicle trading website may be a content rich website including a large number of photos for browsing. Such a website may also be associated with a focused activity, and not an activity that is performed daily or on the go using a mobile device. This type of website may primarily be used with computers and phones, perhaps tablets. Thus, with this particular website, a smaller threshold may be used. Not everyone in the household may be vehicle shopping at the same time, typically only one person shopping may be shopping at any given time. As a second example, a social media platform may be accessed on a more regular basis and from a wider variety of types of devices. Additionally, multiple household members may be accessing the platform at the same time. In this case, a larger threshold value may be used. As a third example, shopping websites with poor mobile experiences, like may be associated with a lower threshold because it is less likely that a variety of different types of devices may be used to access the website. Additionally, the window of time in which the density value is determined may also be adjusted.

In some embodiments, once the IP address associated with the cookie IDs and/or the user agents is determined to be a sticky dynamic IP address, an indication of this may then be stored as a record for future reference. For example, the IP address may be stored in a relationship table in local memory or at a remote location, such as a remote server. The cookie IDs and/or user agents may also be stored in association with the IP address. Additionally, an indication of whether the IP address is a primary sticky dynamic IP address for the cookie IDs and/or user agents as well. This may be further illustrated in FIG. 6. That is, a user 600 may access the website through multiple different sticky dynamic IP addresses. For example, the user may access the website through a sticky dynamic IP address tied to a modem located at their personal residence 602, and may also access the website through a sticky dynamic IP address tied to a modem at a friend's residence 604 or their parent's residence 606. For website activity tracking purposes, the sticky dynamic IP address that is most often used to access the website may be indicated to be a primary sticky dynamic IP address. This sticky dynamic IP address may include an indication in the record that is a primary sticky dynamic IP address for the cookie ID and/or user agent. In some cases, the indication may be in the form of a "rank" value, which may be a numerical value. A rank value of "1" may be used to indicate a primary sticky dynamic IP address. However, any other value and/or type of indicator may also be stored in the record as well.

In some embodiments, the density measurement for a particular IP address may be recalculated periodically as well. For example, a first density measurement may be performed one month, and then a second density measurement may be performed a second month. If the density measurement determined during the second month is greater than the density measurement determined during the first month, then the density measurement associated with the IP address may be replaced by the density measurement determined during the first month. If the density measurement determined during the second month is less than the density measurement determined during the first month, then the density measurement determined during the first month may be retained. In some cases, the comparison may be made within timeframes larger than a month-to-month basis. For example, the logic may looks back 13 months and recalculate a monthly density daily (or at any other interval). However, this is merely an example, and recalculations may theoretically be performed all the way back to the beginning of the data history. This logic may be attempting to identify a disqualifying event (where both the cookie ID number and user agent number are both high). Since the returning visitor/device scenario and the concurrent existence method can change counts in past months, the maximum density is taken.

In some embodiments, continuing the example where a timeframe is a month, each time a recalculation is performed, it may be performed for a calendar month and a current sliding 30 day window. This sliding window when run daily may catch scenarios missed in a calendar month looking back.

This is merely an example of the periodicity of the density measurement recalculations, and the recalculations may be performed in any other intervals as well, such as daily. Additionally, in some cases, cookie IDs and/or user agent counts may be weighted by recency. That is, cookie IDs and/or user agents received by the web server more recently may be weighted more heavily than cookie IDs and/or user agents received by the web server further in the past. In some cases, a natural log adjustment may be used.

Figure 7:
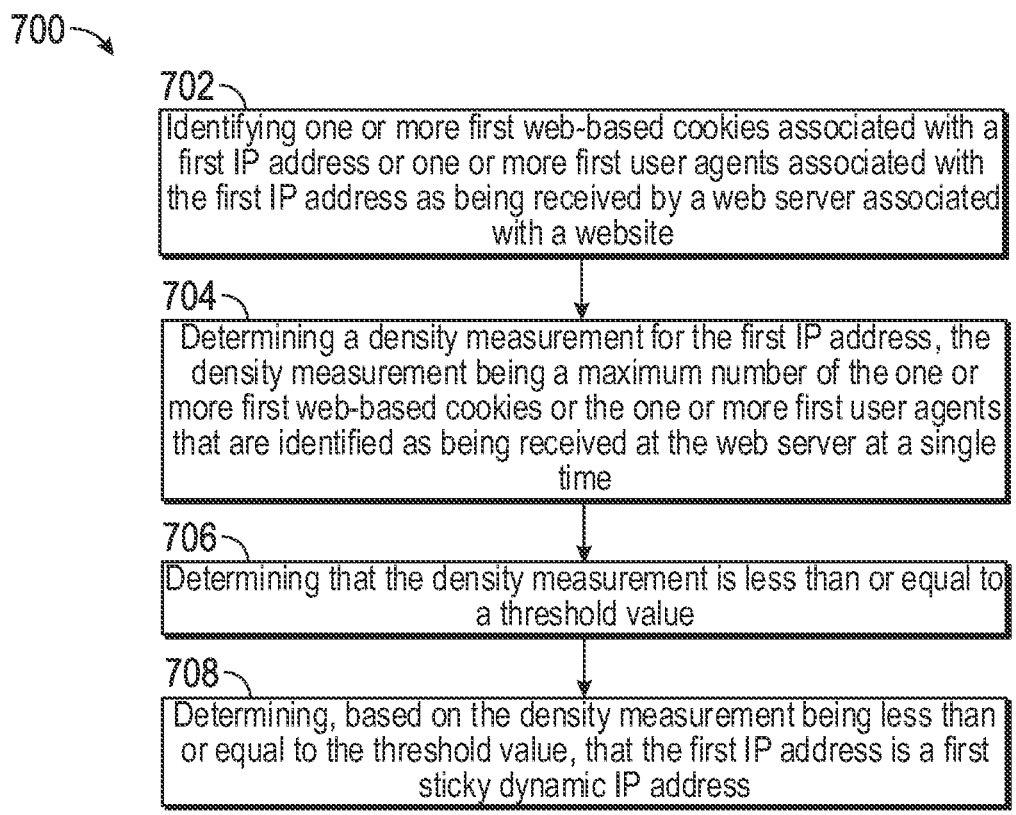
FIG. 7 illustrates an example method, in accordance with one or more embodiments of this disclosure.

FIG. 7 is an example method 700. At block 702 of the method 700 in FIG. 7, the method 700 may include identifying one or more first web-based cookies associated with a first IP address or one or more first user agents associated with the first IP address as being received by a web server associated with a website. At block 704, the method 700 may include determining a density measurement for the first IP address, the density measurement being a maximum number of the one or more first web-based cookies or the one or more first user agents that are identified as being received at the web server at a single time. At block 706, the method 700 may include determining that the density measurement is less than or equal to a threshold value. At block 708, the method 700 may include determining, based on the density measurement being less than or equal to the threshold value, that the first IP address is a first sticky dynamic IP address.

In some embodiments, the method 700 may also include storing, based on the determination that the IP address is a first sticky dynamic IP address, a record of the IP address in memory in association with the one or more first web-based cookies or one or more first user agents.

In some embodiments, the method 700 may also include identifying the one or more first web-based cookies or the one or more first user agents as being associated with a second sticky dynamic IP address in addition to the first sticky dynamic IP address. The method 700 may also include determining that the one or more first web-based cookies or the one or more first user agents are received by the web server through the first sticky dynamic IP address a first number of times and are received by the web server through the second sticky dynamic IP address a second number of times, the first number of times being larger than the second number of times. The method may also include storing, in the record, an indication that the first sticky dynamic IP address is a primary sticky dynamic IP address for the one or more first web-based cookies or the one or more first user agents.

In some embodiments, the method 700 may also include identifying a second web-based cookie or second user agent as being received by the web server. The method 700 may also include searching the memory for the second web-based cookie or second user agent. The method 700 may also include identifying the second web-based cookie or second user agent in the memory as being associated with the first sticky dynamic IP address. The method 700 may also include identifying a third user web-based cookie or third user agent in the memory as also being associated with the first sticky dynamic IP address.

In some embodiments, the method 700 may also include identifying a second web-based cookie or second user agent as being received by the web server. The method 700 may also include searching the memory for the second web-based cookie or second user agent. The method 700 may also include determining that the second web-based cookie or second user agent is not associated with a sticky dynamic IP address in the memory. The method 700 may also include searching the memory for a current IP address associated with the second web-based cookie or second user agent.

In some embodiments, the method 700 may also include identifying one or more second web-based cookies associated with a second IP address or one or more second user agents associated with the second IP address. The method 700 may also include determining a density measurement for the second IP address, the density measurement being a lesser of: a maximum number of the one or more second web-based cookies and a maximum number of the one or more second user agents, wherein the one or more second web-based cookies and the one or more second user agents are identified at a single time. The method 700 may also include determining that the density measurement is less than or equal to a threshold value. The method 700 may also include determining, based on the density measurement being less than or equal to a threshold value, that the second IP address is a sticky dynamic IP address.

In some embodiments, the method 700 may also include determining a second density measurement for the first IP address at a second time. The method 700 may also include determining that the second density measurement is different than the density measurement. The method 700 may also include updating, based on the determination that the second density measurement is different than the density measurement, the record of the IP address.

Figure 8:
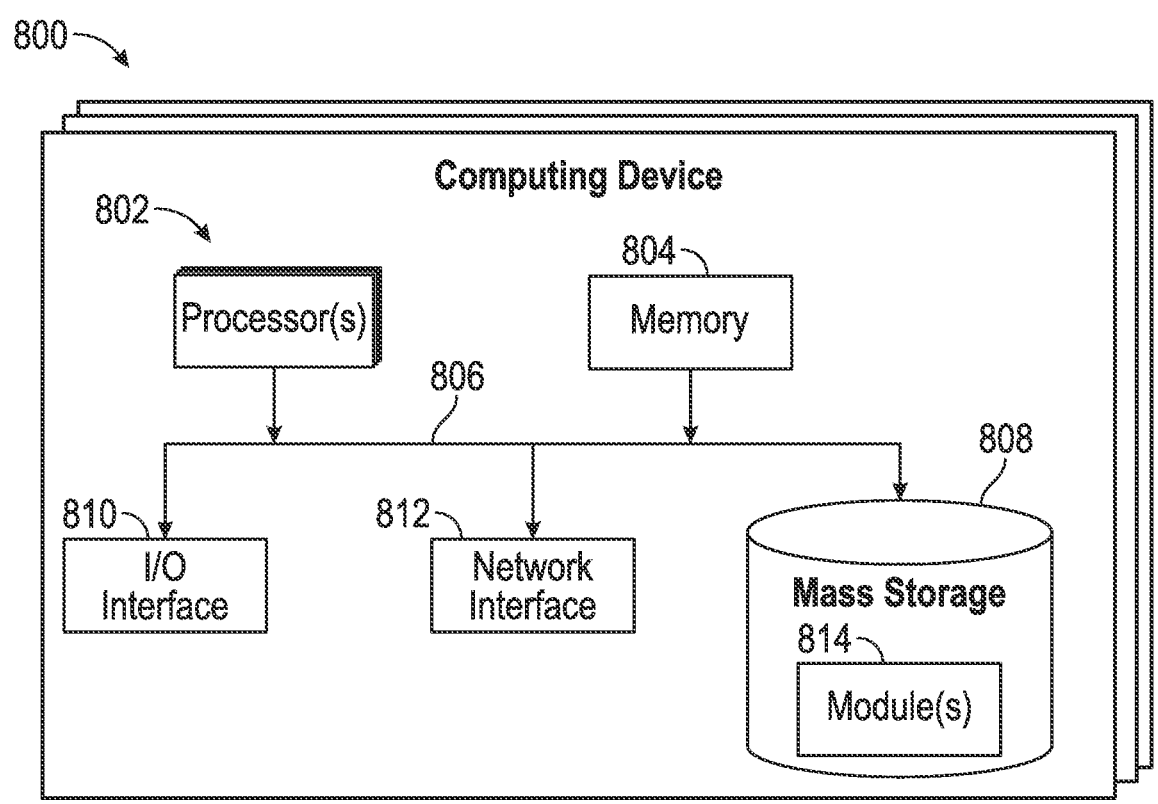
FIG. 8 illustrates an example of a computing system, in accordance with one or more embodiments of this disclosure.

FIG. 8 illustrates an example computing device 800, in accordance with one or more embodiments of this disclosure. The computing 800 device may be representative of any number of elements described herein. The computing device 800 may include at least one processor 802 that executes instructions that are stored in one or more memory devices (referred to as memory 804). The instructions can be, for instance, instructions for implementing functionality described as being carried out by one or more modules and systems disclosed above or instructions for implementing one or more of the methods disclosed above. The processor(s) 802 can be embodied in, for example, a CPU, multiple CPUs, a GPU, multiple GPUs, a TPU, multiple TPUs, a multi-core processor, a combination thereof, and the like. In some embodiments, the processor(s) 802 can be arranged in a single processing device. In other embodiments, the processor(s) 802 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 802 can access the memory 804 by means of a communication architecture 806 (e.g., a system bus). The communication architecture 806 may be suitable for the particular arrangement (localized or distributed) and type of the processor(s) 802. In some embodiments, the communication architecture 806 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

Each computing device 800 also can include mass storage 808 that is accessible by the processor(s) 802 by means of the communication architecture 806. The mass storage 808 can include machine-accessible instructions (e.g., computer-readable instructions and/or computer-executable instructions). In some embodiments, the machine-accessible instructions may be encoded in the mass storage 808 and can be arranged in components that can be built (e.g., linked and compiled) and retained in computer-executable form in the mass storage 808 or in one or more other machine-accessible non-transitory storage media included in the computing device 800. Such components can embody, or can constitute, one or many of the various modules disclosed herein. Such modules are illustrated as modules 814.

Execution of the modules 814, individually or in combination, by at least one of the processor(s) 802, can cause the computing device 800 to perform any of the operations described herein.

Each computing device 800 also can include one or more input/output interface devices 810 (referred to as I/O interface 810) that can permit or otherwise facilitate external devices to communicate with the computing device 800. For instance, the I/O interface 810 may be used to receive and send data and/or instructions from and to an external computing device. The computing device 800 also includes one or more network interface devices 812 (referred to as network interface(s) 812) that can permit or otherwise facilitate functionally coupling the computing device 800 with one or more external devices. Functionally coupling the computing device 800 to an external device can include establishing a wireline connection or a wireless connection between the computing device 800 and the external device. The network interface devices 812 can include one or many antennas and a communication processing device that can permit wireless communication. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A system comprising:
    at least one processor; and
    at least one memory storing computer-executable instructions, that when executed by the at least one processor, cause the at least one processor to:
    identify one or more first web-based cookies associated with a first IP address or one or more first user agents associated with the first IP address as being received by a web server associated with a website;
    determine a density measurement for the first IP address, the density measurement being a maximum number of the one or more first web-based cookies or the one or more first user agents that are identified as being received at the web server at a single time within a time period;
    determine that the density measurement is less than or equal to a threshold value; and
    determine, based on the density measurement being less than or equal to the threshold value, that the first IP address is a first sticky dynamic IP address, wherein the sticky dynamic IP address is an IP address that changes at a first frequency that is less than a second frequency at which a dynamic IP address changes.

2. The system of claim 1, wherein computer-executable instructions further cause the at least one processor to:
    store, based on the determination that the first IP address is a first sticky dynamic IP address, a record of the first IP address in memory in association with the one or more first web-based cookies or one or more first user agents.

3. The system of claim 2, wherein computer-executable instructions further cause the at least one processor to:
    identify the one or more first web-based cookies or the one or more first user agents as being associated with a second sticky dynamic IP address in addition to the first sticky dynamic IP address;
    determine that the one or more first web-based cookies or the one or more first user agents are received by the web server through the first sticky dynamic IP address a first number of times and are received by the web server through the second sticky dynamic IP address a second number of times, the first number of times being larger than the second number of times; and
    store, in the record, an indication that the first sticky dynamic IP address is a primary sticky dynamic IP address for the one or more first web-based cookies or the one or more first user agents.

4. The system of claim 2, wherein computer-executable instructions further cause the at least one processor to:
    identify a second web-based cookie or second user agent as being received by the web server;
    search the memory for the second web-based cookie or second user agent;
    identify the second web-based cookie or second user agent in the memory as being associated with the first sticky dynamic IP address;
    search the memory for additional user web-based cookies or user agents associated with the first sticky dynamic IP address and a ranking value that is indicative of a primary sticky dynamic IP address;
    identify a third user web-based cookie or third user agent in the memory as being associated with the ranking value; and
    determine, based on the third user web-based cookie or third user agent in the memory as being associated with the first sticky dynamic IP address and the ranking value, that the third user web-based cookie or third user agent are also associated with the first sticky dynamic IP address.

5. The system of claim 2, wherein computer-executable instructions further cause the at least one processor to:
    identify a second web-based cookie or second user agent as being received by the web server;
    search the memory for the second web-based cookie or second user agent;
    determine that the second web-based cookie or second user agent is not associated with a sticky dynamic IP address in the memory; and
    search, based on the determination, the memory for a current IP address associated with the second web-based cookie or second user agent.

6. The system of claim 1, wherein computer-executable instructions further cause the at least one processor to:
    identify one or more second web-based cookies associated with a second IP address or one or more second user agents associated with the second IP address;
    determine a density measurement for the second IP address, the density measurement being a lesser of: a maximum number of the one or more second web-based cookies and a maximum number of the one or more second user agents, wherein the one or more second web-based cookies and the one or more second user agents are identified at a single time;
    determine that the density measurement is less than or equal to a threshold value; and
    determine, based on the density measurement being less than or equal to a threshold value, that the second IP address is a sticky dynamic IP address.

7. The system of claim 2, wherein computer-executable instructions further cause the at least one processor to:
    determine a second density measurement for the first IP address at a second time;
    determine that the second density measurement is different than the density measurement; and
    update, based on the determination that the second density measurement is different than the density measurement, the record of the first IP address.

8. A method comprising:
    identifying one or more first web-based cookies associated with a first IP address or one or more first user agents associated with the first IP address as being received by a web server associated with a website;
    determining a density measurement for the first IP address, the density measurement being a maximum number of the one or more first web-based cookies or the one or more first user agents that are identified as being received at the web server at a single time within a time period;
determining that the density measurement is less than or equal to a threshold value; and
determining, based on the density measurement being less than or equal to the threshold value, that the first IP address is a first sticky dynamic IP address.

9. The method of claim 8, further comprising:
storing, based on the determination that the first IP address is a first sticky dynamic IP address, a record of the first IP address in memory in association with the one or more first web-based cookies or one or more first user agents.

10. The method of claim 9, further comprising:
identifying the one or more first web-based cookies or the one or more first user agents as being associated with a second sticky dynamic IP address in addition to the first sticky dynamic IP address, wherein the first sticky dynamic IP address and second sticky dynamic IP address are both associated with a residential location or are both located with a commercial location;
determining that the one or more first web-based cookies or the one or more first user agents are received by the web server through the first sticky dynamic IP address a first number of times and are received by the web server through the second sticky dynamic IP address a second number of times, the first number of times being larger than the second number of times; and
storing, in the record, an indication that the first sticky dynamic IP address is a primary sticky dynamic IP address for the one or more first web-based cookies or the one or more first user agents.

11. The method of claim 9, further comprising:
identifying a second web-based cookie or second user agent as being received by the web server;
searching the memory for the second web-based cookie or second user agent;
identifying the second web-based cookie or second user agent in the memory as being associated with the first sticky dynamic IP address;
searching the memory for additional user web-based cookies or user agents associated with the first sticky dynamic IP address and a ranking value that is indicative of a primary sticky dynamic IP address;
identifying a third user web-based cookie or third user agent in the memory as being associated with the ranking value; and
determining, based on the third user web-based cookie or third user agent in the memory as being associated with the first sticky dynamic IP address and the ranking value, that the third user web-based cookie or third user agent are also associated with the first sticky dynamic IP address.

12. The method of claim 9, further comprising:
identifying a second web-based cookie or second user agent as being received by the web server;
searching the memory for the second web-based cookie or second user agent;
determining that the second web-based cookie or second user agent is not associated with a sticky dynamic IP address in the memory; and
searching, based on the determination, the memory for a current IP address associated with the second web-based cookie or second user agent.

13. The method of claim 8, further comprising:
identifying one or more second web-based cookies associated with a second IP address or one or more second user agents associated with the second IP address;
determining a density measurement for the second IP address, the density measurement being a lesser of: a maximum number of the one or more second web-based cookies and a maximum number of the one or more second user agents, wherein the one or more second web-based cookies and the one or more second user agents are identified at a single time;
determining that the density measurement is less than or equal to a threshold value; and
determining, based on the density measurement being less than or equal to a threshold value, that the second IP address is a sticky dynamic IP address.

14. The method of claim 9, further comprising:
determining a second density measurement for the first IP address at a second time;
determining that the second density measurement is different than the density measurement; and
updating, based on the determination that the second density measurement is different than the density measurement, the record of the first IP address.

15. A non-transitory computer-readable medium storing computer-executable instructions, that when executed by a processor, cause the processor to perform operations including:
identifying one or more first web-based cookies associated with a first IP address or one or more first user agents associated with the first IP address as being received by a web server associated with a website;
determining a density measurement for the first IP address, the density measurement being a maximum number of the one or more first web-based cookies or the one or more first user agents that are identified as being received at the web server at a single time within a time period;
determining that the density measurement is less than or equal to a threshold value; and
determining, based on the density measurement being less than or equal to the threshold value, that the first IP address is a first sticky dynamic IP address.

16. The non-transitory computer-readable medium of claim 15, wherein the computer-executable instructions further cause the processor to perform operations including:
storing, based on the determination that the first IP address is a first sticky dynamic IP address, a record of the first IP address in memory in association with the one or more first web-based cookies or one or more first user agents.

17. The non-transitory computer-readable medium of claim 16, wherein the computer-executable instructions further cause the processor to perform operations including:
identifying the one or more first web-based cookies or the one or more first user agents as being associated with a second sticky dynamic IP address in addition to the first sticky dynamic IP address;
determining that the one or more first web-based cookies or the one or more first user agents are received by the web server through the first sticky dynamic IP address a first number of times and are received by the web server through the second sticky dynamic IP address a second number of times, the first number of times being larger than the second number of times; and
storing, in the record, a first ranking value associated with the first sticky dynamic IP address in the memory and a second ranking value associated with the second sticky dynamic IP address in the memory, wherein the first ranking value provides an indication that the first sticky dynamic IP address is a primary sticky dynamic IP address for the one or more first web-based cookies or the one or more first user agents, wherein the first ranking value and the second ranking value are stored in a database.

18. The non-transitory computer-readable medium of claim 16, wherein the computer-executable instructions further cause the processor to perform operations including:
identifying a second web-based cookie or second user agent as being received by the web server;
searching the memory for the second web-based cookie or second user agent;
identifying the second web-based cookie or second user agent in the memory as being associated with the first sticky dynamic IP address;
searching the memory for additional user web-based cookies or user agents associated with the first sticky dynamic IP address and a ranking value that is indicative of a primary sticky dynamic IP address;
identifying a third user web-based cookie or third user agent in the memory as being associated with the ranking value; and
determining, based on the third user web-based cookie or third user agent in the memory as being associated with the first sticky dynamic IP address and the ranking value, that the third user web-based cookie or third user agent are also associated with the first sticky dynamic IP address.

19. The non-transitory computer-readable medium of claim 16, wherein the computer-executable instructions further cause the processor to perform operations including:
identifying a second web-based cookie or second user agent as being received by the web server;
searching the memory for the second web-based cookie or second user agent;
determining that the second web-based cookie or second user agent is not associated with a sticky dynamic IP address in the memory; and
searching, based on the determination, the memory for a current IP address associated with the second web-based cookie or second user agent.

20. The non-transitory computer-readable medium of claim 15, wherein the computer-executable instructions further cause the processor to perform operations including:
identifying one or more second web-based cookies associated with a second IP address or one or more second user agents associated with the second IP address;
determining a density measurement for the second IP address, the density measurement being a lesser of: a maximum number of the one or more second web-based cookies and a maximum number of the one or more second user agents, wherein the one or more second web-based cookies and the one or more second user agents are identified at a single time;
determining that the density measurement is less than or equal to a threshold value; and
determining, based on the density measurement being less than or equal to a threshold value, that the second IP address is a sticky dynamic IP address.

* * * * *